July 12, 1949.   W. MELAS ET AL   2,475,630
FLOWMETER
Filed Sept. 12, 1944   3 Sheets-Sheet 1
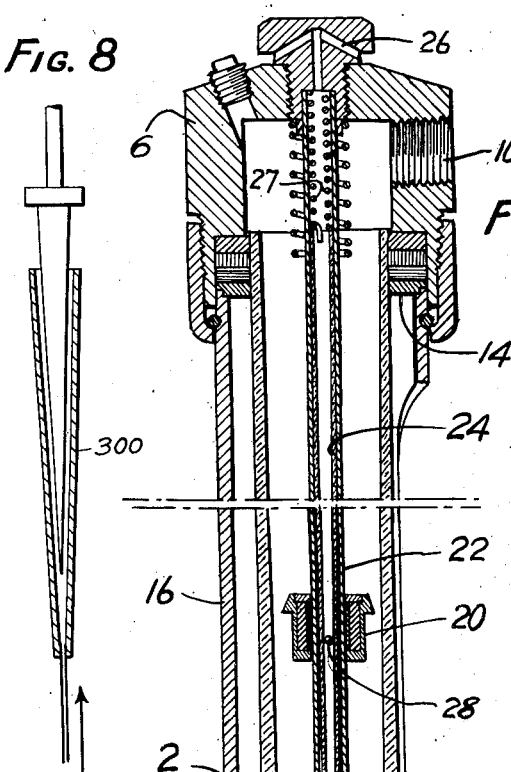
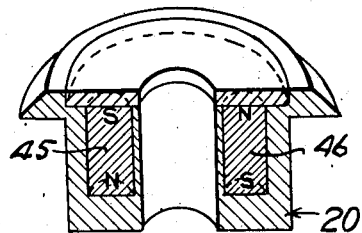
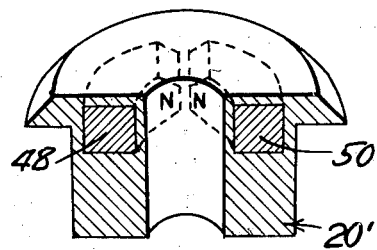
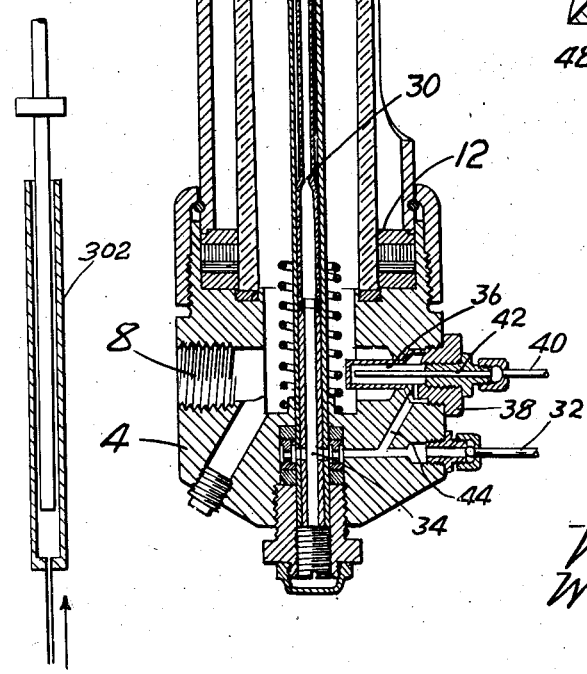
INVENTORS
William Melas &
Winfield B. Heinz
BY
ATTORNEYS.

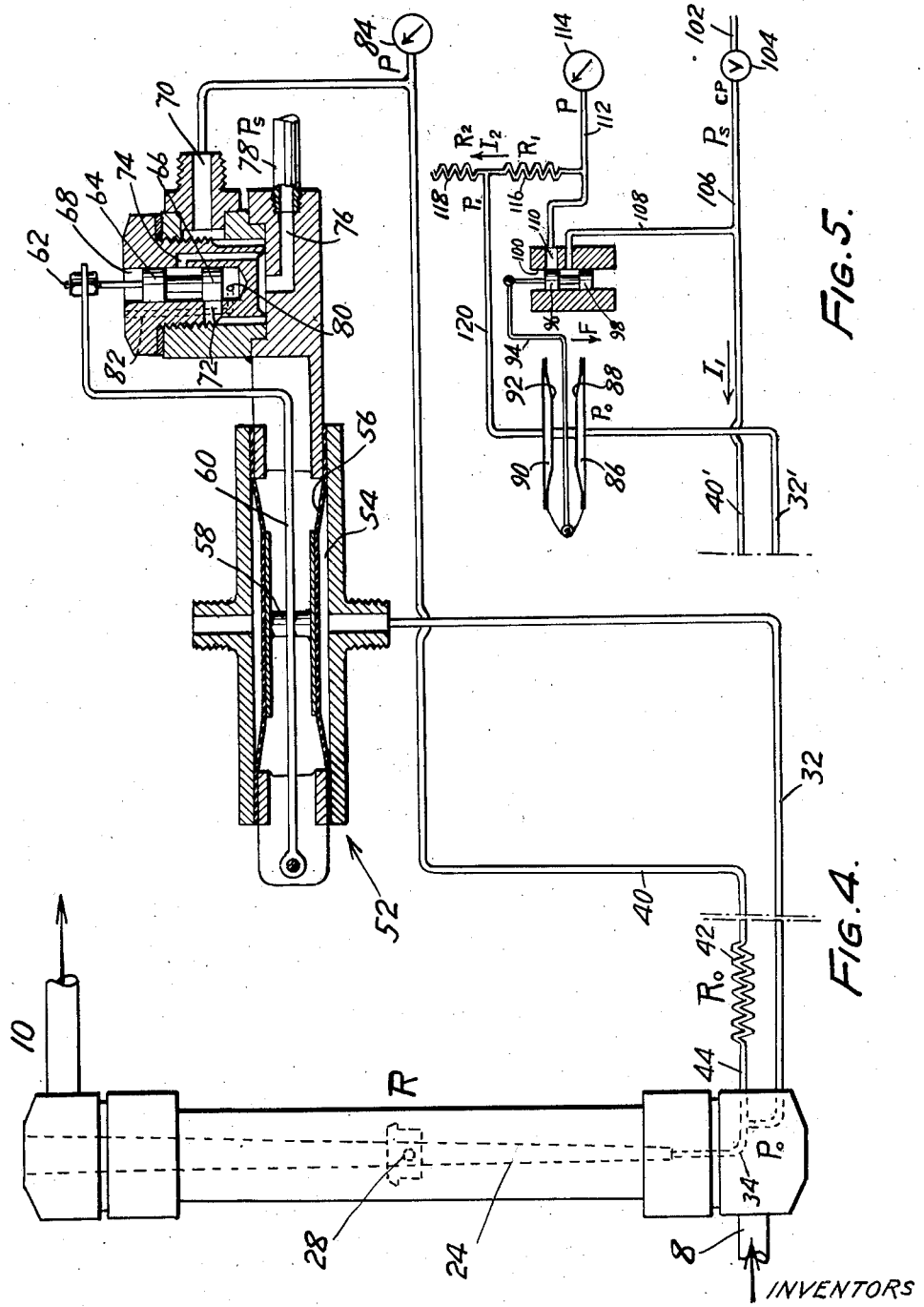

July 12, 1949.  W. MELAS ET AL  2,475,630
FLOWMETER
Filed Sept. 12, 1944  3 Sheets-Sheet 3

WITNESS:

INVENTORS
William Melas &
Winfield B. Heinz
ATTORNEYS

Patented July 12, 1949

2,475,630

UNITED STATES PATENT OFFICE 2,475,630

FLOWMETER

William Melas, Philadelphia, Pa., and Winfield B. Heinz, Bound Brook, N. J., assignors, by mesne assignments, to Penn Industrial Instrument Corporation, a corporation of Pennsylvania Application September 12, 1944, Serial No. 553,700

5 Claims. (Cl. 73—209)

This invention relates to the type of flow metering device in which a movable obstruction attains a position establishing a condition of a variable orifice such that the position is indicative of a fluid flow. A typical device of this type is the rotameter in which a float moving within a tapered tube provides a variable area for the passage of fluid and assumes a position which is dependent upon the rate of fluid flow. The invention is particularly concerned with the provision of means for indicating remotely the position of the obstruction, such as said float, and, hence, for indicating remotely the rate of flow.

The general object of the invention is the provision of a pneumatic type of remote indicator capable of accurately responding to variations in the flow rate, and in particular independently of temperature changes. This general object and other objects of the invention, particularly relating to details, will become apparent from the following description, read in conjunction with the accompanying drawings, in which:

Figure 1 is a longitudinal sectional view of a rotameter with which are associated the remote indicating devices;

Figure 2 is a perspective view partially in section showing one form of float;

Figure 3 is a similar view showing an alternative form of float;

Figure 4 is a diagram showing a remote indicating system and, in particular, showing a relay in section;

Figure 5 is a fragmentary diagrammatic view showing an alternative relay arrangement for giving remote indications of the flow;

Figures 8 and 9 illustrate in diagrammatic sections two types of variable resistances which may be used in conjunction with the invention.

Figure 6:
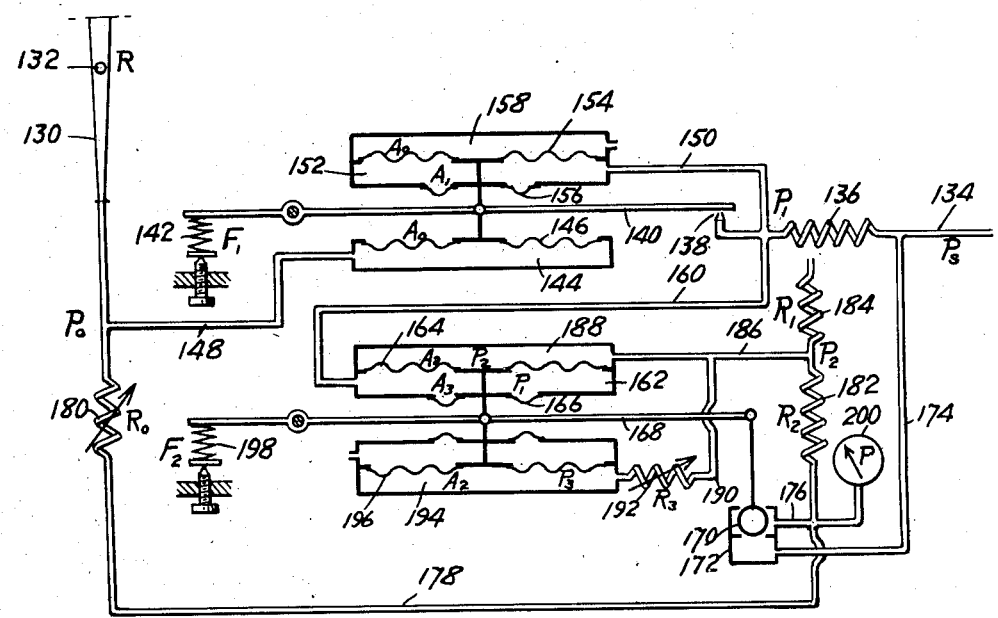
Figure 6 is a diagram of an alternative indicating system having certain advantages, particularly independence of a variable supply pressure.

Referring first to Figure 1, the rotameter shown therein, as typical of a meter to which the invention is applicable, comprises a tube 2 having a tapered interior, which tube is of a type commonly used in rotameters. In the event it is desired that the rotameter readings should be observed locally as well as remotely, the tube may be transparent and provided with suitable graduations against which the positions of the float may be read to give indications of rate of flow. The ends of the tube are engaged in fittings 4 and 6 provided with the respective inlet and outlet openings 8 and 10, through which fluid may be admitted for flow through the tube 2. Suitable packing 12 and 14 is associated with the fittings 4 and 6, the tube, and the protective casing 16, the construction in these respects being substantially conventional and requiring no detailed description.

A float 20 which may be of conventional exterior form is, as contrasted with prior types of rotameters, provided with a somewhat enlarged bore serving to receive the fixed cylindrical tube 22 of brass or other non-magnetic material. The float 20 has a sliding fit on this tube. In the interior of the tube 22 is a tapered tube 24 preferably of glass inasmuch as such a tube may be provided with an accurately shaped bore which, in this instance, is tapered, being enlarged as indicated at its upper end as compared with its lower end. The upper end of this tube is vented to the atmosphere at 26. It may be positioned against a lower seat in the tube 22 by means of a light spring 27. Within the tube 24 is a steel ball 28 which is arranged to follow the float by reason of the provision of magnets within the float as will be hereafter described in greater detail. Adjacent its lower end, the tube 24 is provided with a seat 30 to catch the ball and retain it when the float drops beyond its useful operating range.

For the purpose of providing remote indications various air connections are present including a connection 32 in free communication with the space 34 within the lower end of the tube 22 which communicates with the lower end of the tapered tube 24. A supply of air to the lower end of tube 24 is effected through the connection 40 leading to a capillary tube 42 which provides a substantial resistance to flow of air and which delivers the air into a space 36 in a thimble 38 threaded into the fitting 4, which space 36 communicates through a passage 44 with the space 34. The capillary tube 42, it will be noted, is located in the lower fitting 4. As a result of this construction it is at all times substantially at the temperature of the ball 28 and tube 24. Thus both flow resistances are subject to the same temperature variations and compensation is thereby effected.

As illustrated in Figure 2, the float 20 may be provided with a pair of magnets 45 and 46 positioned with their opposite poles across the bore in the float from each other. These magnets will pick up the ball 28 as the float moves and will always maintain it in a position accurately corresponding to the position of the float.

An alternative arrangement of magnets is indicated in Figure 3 in which a float 20' is provided with arcuate magnets indicated at 48 and 50 with their like poles adjacent to each other, thereby providing a strong magnetic field extending across the bore and so carrying the ball 28 as the float moves. The ball is thus positioned so as to have varying clearance with the tapered walls of the tube 24 affording a variable resistance which is related to the float position and, therefore, to the rate of flow through the meter.

The remote indicating devices are essentially measuring devices for the resistance to flow which appears at the location of the ball 28. One system for accomplishing this is indicated in Figure 4. In this figure, the matter to the left of the broken line represents diagrammatically the rotameter just described. Indicated therein in diagrammatic fashion are the ball 28, the tapered tube 24 in which the ball moves, and the connections 32, 34, 40, and 44, with the resistance afforded by the capillary tube 42 being indicated diagrammatically.

For the purpose of giving indications of the very slight changes in resistance to air flow produced at the ball 28, there is provided a relay indicated generally at 52. This is provided with a chamber 54 closed by a flexible diaphragm 56 and communicating with the connection 32. (The relay is also provided with an upper diaphragm chamber which, in the present application, is not used, though such a chamber is used in a modification later to be described.) The diaphragm 56, through an abutment 58, acts upon a pivoted arm 60 which, through a flexible wire 62, is arranged to move a connected pair of pistons 64 and 66 in a cylinder 68. The connection 40 is joined to an opening 70 which communicates with a port 72 slightly less in diameter than the length of the face of the piston 66 which has only a slight movement to open the port 72 to either the space above or the space below the piston. A port 74 joins the space between the pistons 64 and 66 with a passage 76 to which a supply of air under pressure is applied through the line 78. The space below the piston 66 is vented to the atmosphere through openings indicated at 80 and 82. A pressure gauge 84 is connected to the line 40 and serves to indicate a pressure P which will be a function of the resistance at the ball 28 and, consequently, of the rate of flow through the meter. The following will make clear the relationship of the pressure P to the resistance to air flow occasioned by the ball 28.

Suppose in the modification of Figure 4, the variable resistance R is provided by the ball, which resistance is a function of the position of the float. By the diaphragm action the pressure between resistances $R_o$ and R is maintained constant at some value $P_o$ fixed by the downward pressure on the diaphragm 56. The action of the valve will be to provide a pressure P at the gauge, the relationship of which to R may be determined as follows:

The flow I of air through R and $R_o$ is the same, save for minute quantities entering the diaphragm chamber 54 which is of very small volume. Therefore:

$$P - P_o = R_o I$$
$$P_o = RI$$

Elimination of I gives:

$$P = P_o\left(1 + \frac{R_o}{R}\right)$$

the functional relationship between P and R. P is therefore a function of the float position and may be calibrated to give direct readings of fluid flow.

It will be noted that the supply pressure $P_s$ does not enter into the above so that it need not be regulated except to the extent that it must be greater than P.

It will be evident from the above that by a proper choice of $R_o$ and $P_o$ the pressures appearing on the gauge may be very much magnified over the pressure existing at $P_o$, which pressure will normally be quite small inasmuch as the rate of air flow is desirably kept low. While the pressure $P_o$ is small, it can be made to act upon a quite large diaphragm at 56 so as to be capable of affording positive control of the valve.

While the pressure at $P_o$ is held constant in the modification of Figure 4, that condition need not be established, but certain alternative forms of indicators of the resistance R may be provided, one of which is indicated diagrammatically in Figure 5 in which it will be understood that the connections indicated at 32' and 40' are connected to 32 and 40, respectively, at the position of the broken line. The connection 32' communicates with the chamber 86 closed by a diaphragm 88. An upper chamber 90 is closed by a diaphragm 92 which acts in opposition to the diaphragm 88 upon a lever 94, the construction being somewhat similar to that previously indicated at 52. The lever 94 operates joined pistons 96 and 98 in a cylinder 100.

The air pressure supply line indicated at 102 feeds air to a constant pressure regulating valve 104 which delivers air at constant pressure to the line 106 which connects with the line 40'. A connection 108 from the line 40', 106 communicates with a port opening to the space between the pistons 96 and 98.

A port 110 having a diameter slightly less than the axial extent of the piston 96 is normally overlapped by this piston, movements of which in an upward direction furnish communication between the line 108 and the port 110 and movements of which in a downward direction vent the port 110 to the atmosphere. A line 112 connected to the port 110 leads to a pressure gauge 114 serving as an indicator for the system. Two resistances 116 and 118 arranged in series serve to vent the line 112 to the atmosphere. Between these resistances there is the connection 120 to the upper chamber 92.

In the case of the modification of Figure 5, R and $R_o$ may be considered to be as before, pressure $P_o$ existing between R and $R_o$ and applied to the lower diaphragm chamber. $P_s$ is the supply pressure, in this case regulated, since, as will be seen hereafter, it enters into the calibration of the system. Resistances $R_1$ and $R_2$ exist as indicated, as do also pressures P and $P_1$. Let the flows through $R_o$ and R and through $R_1$ and $R_2$ be, respectively, $I_1$ and $I_2$. Let F be a downward force on the lower diaphragm in terms of effective force per unit area thereof.

Then:
$$P_s - P_o = R_o I_1$$
$$P_o = R I_1$$
$$P - P_1 = R_1 I_2$$
$$P_1 = R_2 I_2$$
$$P_1 + F = P_o$$

Elimination of $I_1$, $I_2$, $P_o$, and $P_1$ from these gives:

$$P = \left(1 + \frac{R_1}{R_2}\right)\left\{P_s \frac{1}{\left(1 + \frac{R_o}{R}\right)} - F\right\}$$

The force F referred to in the foregoing may be applied by a weight or spring, and it will be evident that it serves to change the range of pressure P corresponding to a particular range of variation of resistance R. A further possibility of adjustment, it will be noted, is involved in the setting of the valve 104 to control a particular constant pressure $P_s$. If a spring is used to supply the force F there will be a slight deviation of actual conditions from what is represented by the foregoing expression for P, the deviation depending upon the departure of the actual relay from an ideal one in which the pilot valve has no motion. Actually F will be variable with the motion of the pilot valve necessary to open the top or bottom of the port at 110. Such motion may, however, be very small.

In the modification shown in Figure 5 the flow of air past the ball is nearly constant, the pressure drop across R being negligible in comparison with that across $R_o$.

As will be seen from the foregoing examples, a remote indication of the position of the float of the rotameter is made possible. The particular lines connected to a remote position are, of course, subject of variation. If the relay of either type is located remote from the meter, two lines may be run to the relay and the pressure gauge located thereat. On the other hand, the pressure gauge may be at a remote position with the rotameter and relay adjacent each other. It will be evident that essentially what is involved is a very substantial magnification of the pressure drop which exists across the ball 28. By magnification, it is not meant that this magnification is linear, but rather that a large pressure difference can be made to appear at a gauge and will be a function of the resistance presented at the ball 28.

While the description has indicated the ultimate application of the magnified pressure to a pressure gauge, it will be evident that the pressure produced by the system may be utilized for control purposes in conventional fashions, controlling, for example, a valve regulating the flow which takes place through the rotameter with the objective of maintaining such flow constant, or, alternatively, such pressure may be applied for controlling the application of heat to a system which also involves flow and wherein a quantity of heat added is some function of a rate of flow. Still another application would be the control of some pressure in accordance with a rate of flow. It will thus be evident that the invention is of very broad applicability.

It will also be noted that this invention is not limited to a rotameter which has been described merely by way of a typical application of the invention to which it is very well adapted. Any movable obstruction or element capable of carrying a member such as the ball 28 could have its position indicated by the means described. In various applications the ball may be replaced by a rod moving in a tapered or uniform diameter tube, as at 300 in Figure 8 or at 302 in Figure 9, respectively. The sole limitation on structural possibilities is that the control of the variable resistance should not entail execution of any such force as will react on a float or other moving member to displace it to a substantial degree from a position which it would normally assume under the action of fluid flow. By this there is, of course, meant a variable force. The weight of a ball such as 28 may be merely considered as part of the weight of the float. By the use of an amplifying relay system of the type described the forces exerted by air flow may be kept so low as not to become disturbing factors.

It was remarked above that the supply pressure does not enter into the operation of the modification in Figure 4 and this is true provided the valve is well balanced and the variations in supply pressure are not too great causing a degree of unbalance. In order to avoid any possible disturbing effects due to supply pressure fluctuations and additionally to secure other advantages such as further elimination of friction, it is desirable under some circumstances to provide a more elaborate responsive device such as one of those illustrated in Figures 6 and 7.

Referring first to Figure 6, there is indicated at 130 a tapered tube in which moves a ball 132 to provide a movable obstruction giving rise to a variable resistance to the flow of air. As indicated above this is merely an example of a variable resistance member which may take other forms. The elements illustrated in Figure 6 produce a pressure responsive to the value of the resistance R appearing at 132. A supply line 134 feeds air to the system. A resistance 136 is interposed between the supply line and an orifice or nozzle 138 closely adjacent to which is an end of a lever 140 having an adjustable substantially fixed force applied to it at 142. A chamber 144 closed by a diaphragm 146 is connected to the lower end of the tube 130 at 148. This diaphragm is mechanically connected to the lever 140. A line 150 from the nozzle 138 communicates with a chamber 152 closed by a large diaphragm 154 and a smaller diaphragm 156 as indicated, both of which are mechanically connected to the lever 140. The space 158 above the diaphragm 154 is open to the atmosphere. A line 160 leads from the nozzle 138 to a chamber 162 provided with a large upper diaphragm 164 and a smaller diaphragm 166, both of which are connected to a lever 168 which controls valve 170 provided with seats in a valve housing 172. This valve is merely diagrammed in Figure 6 and may take either the form of a valve member moving between the seats as indicated or of a slide valve of one of the types previously described. The operation of this pilot valve is to control the pressure in an outlet line 176, there being a connection between the valve casing and the source of air at 174. The output of the pilot valve is connected through line 178 and variable resistance 180 with the lower end of tube 130. The resistance 180 may be of the type described in connection with Figure 1 built into a rotameter or other flow meter.

Two fixed resistances 182 and 184 are provided between 176 and the atmosphere. The junction between them is connected to a chamber 188, the lower wall of which is provided by the diaphragm 164 previously described. Chamber 188 is connected through a passage 190 and an adjustable resistor 192 with a chamber 194 closed by a diaphragm 196 connected to the lever 168. The upper side of diaphragm 196 is open to the atmosphere. A spring 198 may be adjusted to provide a suitable force on the lever 168. A gauge 200 is connected to 176 to give pressure indications corresponding to the position of the obstruction 132. This gauge may be calibrated directly in terms of the flow through the meter.

Pressures and resistances $P_o$, $R$ and $R_o$ corresponding to those of Figure 4 are designated by the same reference characters and the outlet pressure P is related to the constant pressure $P_1$ and to the resistances R and $R_o$ in the identical fashion given above for the relation of P to $P_o$ in the modification of Figure 4. The pressure $P_1$ is a constant function of the forces $F_1$ and $F_2$ applied to the levers. Under equilibrium conditions $P_o$ is also constant as shown below.

Under conditions of a change of resistance R transient relations are set up which involve a floating action. Assume, for example, an increase in the resistance R. The pressure $P_o$ immediately rises and the baffle provided by the lever 140 moves slightly away from the nozzle 138 with consequent decrease of the nozzle pressure $P_1$. This decrease acting in the chamber 152 equalizes the increase of pressure $P_o$ with the result that the nozzle pressure always changes by an amount which is directly proportional to the change in the pressure $P_o$. The pressure $P_1$ is applied to chamber 162 resulting in a corresponding decrease in the output pressure P. By reason of the consequently reduced flow through resistance 180 the pressure $P_o$ is then reduced toward its initial value. Without the provision of anything further it would be evident that the pressure $P_o$ would never be brought back exactly to its initial value by this proportional action alone. However, by the action of chamber 188 and 194 and the connecting resistance 192, the pressure $P_o$ is restored to its initial value. This occurs because by reason of the reduction of pressure P, there is a reduction of the pressure $P_2$ between the resistances 182 and 184 and in the chamber 188. Flow of air accordingly takes place from the chamber 194 to the chamber 188 through the resistance 192 giving a floating action which continues until the pressure $P_o$ has been restored to its initial value and the nozzle pressure $P_1$ is also at its initial value. Finally the pressures $P_2$ and $P_3$ are once again equal but at a lower value than that existing before the assumed change in resistance R.

Figure 7:
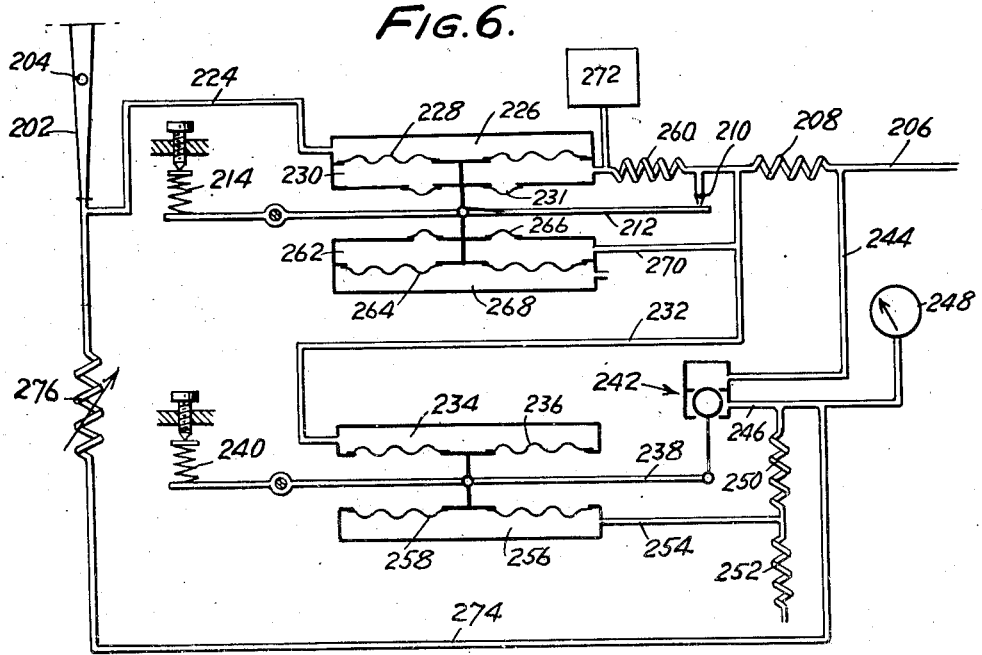
Figure 7 is a diagram of still another system embodying the invention.

The modification illustrated in Figure 7 is essentially identical with that involved in Figure 6 with the exception that the floating action is introduced into the first relay instead of the second. In Figure 7, the tube 202 and ball 204 provide a variable resistance as before. The supply line 206 supplies through fixed resistance 208 the nozzle 210 with which cooperates the lever 212 acting as a baffle and properly biased by the force exerted by the adjustable spring 214. A connection 224 joints the lower end of the tube 202 with a chamber 226 provided with a diaphragm 228 connected to the lever 212. Below the diaphragm 228 is a second chamber 230 which is closed by a small diaphragm 231 also connected to the lever 212. The chamber 230 is connected to the nozzle 210 through the resistance 260.

The nozzle 210 is connected through tube 232 to a chamber 234 closed by a diaphragm 236 which acts upon the lever 238 biased by the adjustable force exerted by a spring 240 and arranged to actuate a valve 242 of the type previously described. The valve is supplied with air from line 206 through connection 244 and delivers air at controlled pressure to the line 246 and the pressure gauge 248. Resistances 250 and 252 in series vent the line 246 to the atmosphere. Connection 254 joins the junction of the resistances 250 and 252 to a chamber 256, the diaphragm 258 closing which is connected to the lever 238.

A chamber 262, closed by a large diaphragm 264 and a small diaphragm 266 as illustrated, both of which are connected to the lever 212, communicates through passage 270 with the connection 232. The space 268 below the diaphragm 264 is vented to the atmosphere. Connection 274 through adjustable resistance 276 joins line 246 with tapered tube 202.

The action of the system of Figure 7 is, as stated, that of Figure 6 and need not be described in detail. A floating action exists at the upper relay due to the presence of the resistance 260. To increase the time constant of this the volume of the chamber 230 may be increased by the addition of an air chamber 272 connected to it.

Additionally, there exists in this modification an amplification by reason of the effective area of the diaphragm closing chamber 226 in relation to the effective area of the diaphragms enclosing chamber 262 which area is the difference between the areas of diaphragms 264 and 266. This area amplification is desirable inasmuch as the drop of pressure across the ball 204 should be kept to the order of one inch of water. For practical purposes it is desirable to deliver an output pressure ranging up to fifteen pounds per square inch. Overall pressure amplification of the order of five hundred is required. Imperfections in pilot valve characteristics make it difficult to achieve such a high amplification without serious nonlinearity, and consequently it is desirable to introduce part of the amplification in one of the relays by the use of the ratio of areas which can readily be made of the order of five. Thus the associated amplification by the arrangement of resistances need not be greater than about one hundred, an amplification which can be satisfactorily attained. It may be noted that such area amplification is also applicable to the modification shown in Figure 6.

What we claim is:

1. In combination, a rotameter comprising a float arranged to assume a variable position corresponding to a rate of flow through the meter, said float being provided with a magnet, a tube of varying internal cross-section, a member of magnetic material within said tube and adapted to be carried by said magnet, thereby to assume within said tube positions corresponding to those of the float and offer varying resistance to fluid flow through the tube depending upon the float position, means providing a flow of fluid through said tube, and means for producing a pressure as a function of the resistance to flow appearing at the member, said pressure being in excess of the pressure drop across the member.

2. In combination, a rotameter comprising a float arranged to assume a variable position corresponding to a rate of flow through the meter, said float being provided with a magnet, a tube of varying internal cross-section, a member of magnetic material within said tube and adapted to be carried by said magnet, thereby to assume within said tube positions corresponding to those of the float and offer varying resistance to fluid flow through the tube depending upon the float position, means providing a flow of fluid through said tube, and means for producing a pressure as a function of the resistance to flow appearing at the member, said pressure varying through a range substantially exceeding the range of pressure drop across the member.

3. In combination, a rotameter comprising a float arranged to assume a variable position corresponding to a rate of flow through the meter, said float being provided with a magnet, a tube of varying internal cross-section, a member of magnetic material within said tube and adapted to be carried by said magnet, thereby to assume within said tube positions corresponding to those of the float and offer varying resistance to fluid flow through the tube depending upon the float position, means providing a flow of fluid through said tube, and means for producing a pressure in excess of the pressure drop across said member which is a function of the resistance to flow appearing at the member.

4. In combination, a flow meter comprising a member displaceable in accordance with flow, said member being provided with a magnet, a tube of varying internal cross-section, an element of magnetic material within said tube and adapted to be carried by said magnet, thereby to assume within said tube positions corresponding to those of the member and offer varying resistance to fluid flow through the tube depending upon the position of the member, means providing a flow of fluid through said tube, and means for producing a pressure in excess of the pressure drop across said element which is a function of the resistance to flow appearing at the element.

5. In combination, a flow meter comprising a member displaceable in accordance with flow, said member being provided with a magnet, a tube of varying internal cross-section, an element of magnetic material within said tube and adapted to be carried by said magnet, thereby to assume within said tube positions corresponding to those of the member and offer varying resistance to fluid flow through the tube depending upon the position of the member, means providing a flow of fluid through said tube, and means for producing a pressure in excess of the pressure drop across said element which is a function of the resistance to flow appearing at the element, the last mentioned means comprising a resistance located so as to be subject to the same temperature variations as occur at said element.

WILLIAM MELAS.
WINFIELD B. HEINZ.

REFERENCES CITED

The following references are of record in the file of this patent:

UNITED STATES PATENTS

| Number | Name | Date |
|---|---|---|
| 648,054 | Reisert | Apr. 24, 1900 |
| 1,191,415 | Gibson | July 18, 1916 |
| 2,056,177 | Erbguth | Oct. 6, 1936 |
| 2,131,486 | Spitzglass | Sept. 27, 1938 |
| 2,260,516 | Gerber | Oct. 28, 1941 |
| 2,263,335 | Heinz | Nov. 18, 1941 |
| 2,311,853 | Moore | Feb. 23, 1943 |
| 2,351,745 | Donaldson | June 20, 1944 |
| 2,352,312 | Donaldson | June 27, 1944 |
| 2,354,423 | Rosenberger | July 25, 1944 |
| 2,380,399 | Bowie | July 31, 1945 |

FOREIGN PATENTS

| Number | Country | Date |
|---|---|---|
| 455,065 | Great Britain | Oct. 13, 1936 |